H. M. FERRY.
VEHICLE WHEEL AND SCRAPER FOR SAME.
APPLICATION FILED DEC. 29, 1920.
1,430,968.
Patented Oct. 3, 1922.
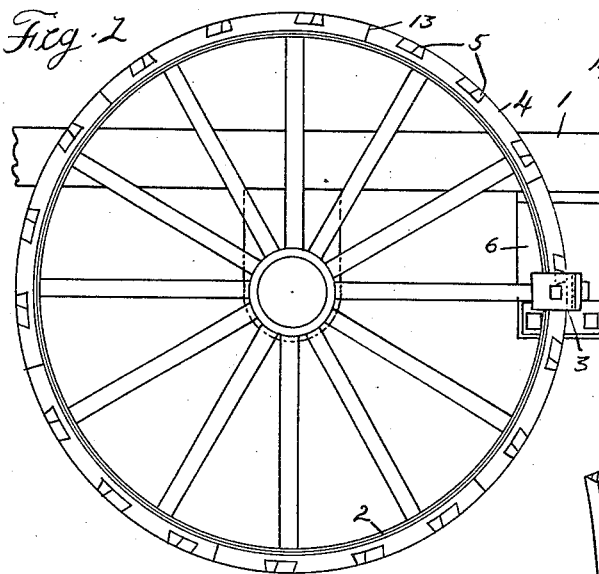
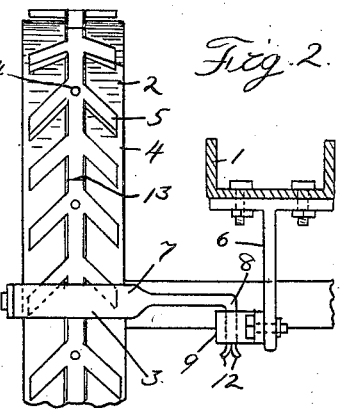
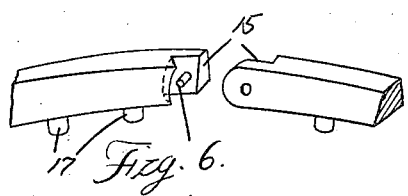
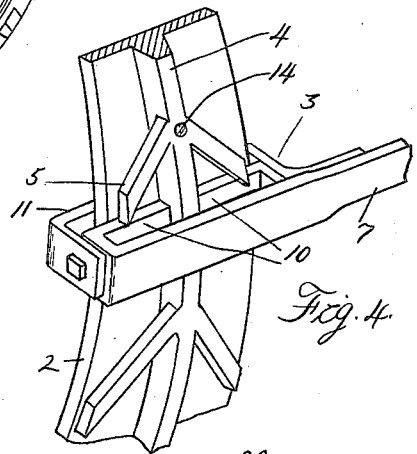
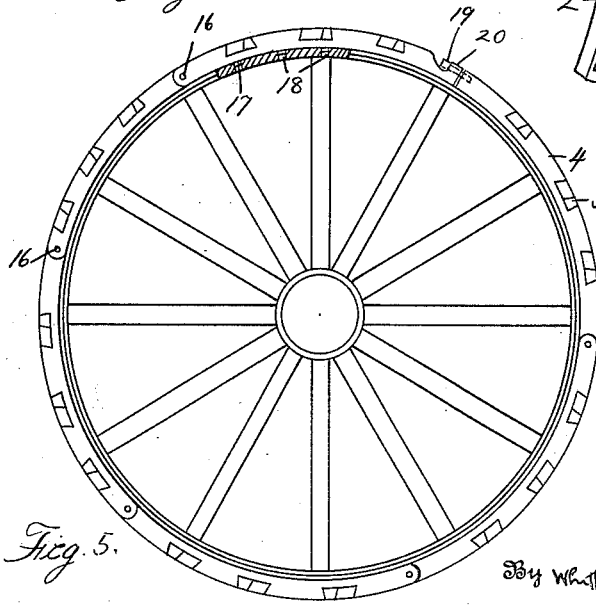
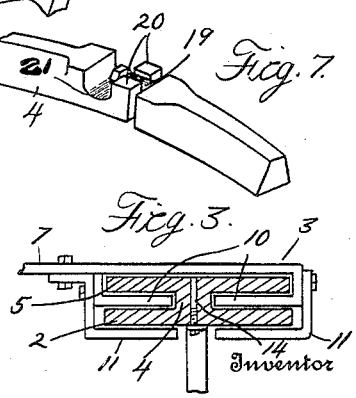
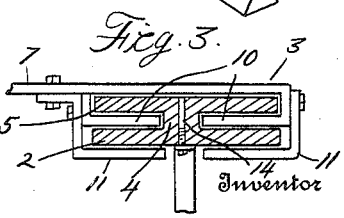
Inventor
Henry M. Ferry
By Whittemore, Hulbert, and Whittemore
Attorneys Patented Oct. 3, 1922.

1,430,968

UNITED STATES PATENT OFFICE.

HENRY M. FERRY, OF DETROIT, MICHIGAN.

VEHICLE WHEEL AND SCRAPER FOR SAME.

Application filed December 29, 1920. Serial No. 433,835.

*To all whom it may concern:*

Be it known that I, HENRY M. FERRY, a citizen of the United States of America, residing at Detroit, in the county of Wayne and State of Michigan, have invented certain new and useful Improvements in Vehicle Wheels and Scrapers for Same, of which the following is a specification, reference being had therein to the accompanying drawings.

This invention relates to a vehicle wheel and a rim scraper therefor and relates particularly to a scraping means for vehicle wheels having cleats, mud lugs or like traction projections.

It is a primary object of the invention to associate a rim scraper with a vehicle wheel having a series of circumferentially spaced traction projections, and to so mount said projections upon the rim and form the blades of the scraper as to provide for scraping the outer faces both of the rim and said projections.

In attaining this object, the invention contemplates the provision upon a rim of a circumferential rib and a series of circumferentially spaced mud lugs, outwardly spaced from the greater portion of this length from the rim and a scraper member having blades for engaging the exterior face of the rim and passing between said mud lugs and said face as the wheel rotates.

A further object of the invention is to provide a vehicle wheel rim scraper mounted upon the vehicle in such a manner that under excessive strain, it will pull loose from its supporting bracket, thus avoiding any breakage of parts under such conditions.

Still another object of the invention is to provide a vehicle wheel having a rim provided with cleats or mud lugs and to provide novel quick detachable engagement between traction projections and rim so that removal of said projections may be readily effected when it is desired to use the wheel upon a paved surface.

A preferred embodiment of the invention is illustrated in the accompanying drawing wherein:

Figure 1 is a view showing the end portion of the frame of a tractor or like vehicle disclosing said vehicle equipped with a wheel having the herein described novel traction projections and engaged by the herein described improved scraper;

Figure 2 is a plan view of the same;

Figure 3 is a cross section view of the wheel rim showing the scraper engaged therewith;

Figure 4 is a perspective view of the same;

Figure 5 is a view in side elevation of a modified type of vehicle wheel with which the improved scraper may be used;

Figure 6 is a detail perspective view showing the type of joint employed to connect sections of the traction projections employed on the wheel shown in Figure 5;

Figure 7 is a detail perspective view showing another joint employed in mounting said sections on the wheel.

In these views the reference character 1 designates the frame of a tractor or like vehicle, 2 is the rim of a wheel of said vehicle and 3 is the scraper member carried by said frame and engaging said rim. Said rim is provided with traction projections one of which is in the nature of a circumferential rib 4, while the others are in the nature of transverse cleats or mud lugs 5 suitably spaced. The scraper 3 is carried by a bracket 6 depending rigidly from the frame 1. Said scraper comprises a plurality of blades and an arm 7 carrying said blades and provided with a down turned inner end portion 8 engaging in a socket or bearing member 9 mounted fast upon the bracket 6. As is best shown in Figure 3 the outer end portion of the arm 7 extends in proximity to the rib 4 and mud lugs 5 serving to scrape the same. A pair of opposed blade members 10 mounted upon said arm engage the outer surface of the rim 2 and a similar pair of blade members 11 act upon the inner surface of said rim. To prevent the mud lugs 5 forming obstacles which will interfere with rotation of the wheel through encountering the scraper blades 10, said mud lugs are formed as lateral projections from the rib 4 and are sufficiently spaced outwardly from the rim 2 to provide for passage of the blades 10 between the rim and said lugs. Said lugs are preferably of resilient material so that they under severe stresses, may deflect considerably without weakening.

It is desirable to provide for yielding of the scraper member in case it is subjected to an excessive stress as might be the case if a stone or the like became lodged between one of the mud lugs 5 and the rim. To permit such yielding the scraper is so mounted upon the vehicle frame that it may be pulled loose through rotation of the wheel if for any reason it offers an abnormal resistance of such rotation. Thus the arm 7 is constructed of relatively thick bar metal of a very strong character to prevent the same bending at the elbow when subjected to strain and the down turned end 8 thereof is loosely mounted within the socket 9. The extremity of the down turned end 8 of the arm 7 is constructed of relatively light material which is welded or otherwise suitably secured thereto and split as indicated at 12 the furcations thus formed being divergently bent as is best shown in Figure 2. Said furcations 12 offer a predetermined resistance to dislodgment of the arm 7 from the socket 9. In case of an excessive strain acting upon the scraper member, however, the furcations 12 will be bent into proximity and permit the arm 7 to be carried by the wheel out of engagement with said socket.

Occasion some times arises to move vehicles of the tractor type, having the rims of their wheels equipped with traction projections, over paved surfaces and since such projections are detrimental to such surfaces it is desirable to provide for removal of the traction projections when desired. The present invention makes such provision by forming the rib 4 and its integral mud lugs 5 in several sections abutting as indicated at 13 and secured to the rim 2 by bolts 14 or other suitable detachable fastenings.

Figures 5, 6 and 7 disclose a further means for accomplishing the same result, the circumferential rib and integral lugs being in this case formed in sections having overlapping end portions 15 pivotally connected as indicated at 16, a series of pins 17 being provided upon the inner face of said sections for engagement within suitable socket openings 18 formed in the rim. Thus, in this construction, the sections forming the traction projections are permanently linked together similarly to the links of a chain. To permit attachment and detachment of this link structure, the final joint which is illustrated in Figure 7 is not in the nature of a permanent connection but is formed by a clamping bolt 19 circumferentially engaging the end of one of the abutting sections and engageable between a pair of lugs 20 terminally formed on the other abutting section, the last mentioned section being transversely grooved as indicated at 21 adjacent said lugs to accommodate the head of said bolt.

The wheels of a vehicle employing the described combination of traction projections and scraping member are self cleaning and consequently relieve the operator of a vehicle equipped with said wheels from considerable labor in removing accumulated mud and dirt. The use of the described scraper furthermore eliminates a wasteful load upon the engine by maintaining the wheels constantly clean and in condition to facilitate travel.

Furthermore a tractor equipped in accordance with the described invention can travel over muddy, slippery and inclined surfaces, where traction would be entirely lost if mud were allowed to clog the wheels and render the cleats useless.

What I claim as my invention is:

1. The combination with a vehicle wheel, of a scraper member exteriorly and interiorly engaging the rim of said wheel.

2. The combination with a vehicle wheel having its rim equipped with traction projections, of a scraper member having blades acting upon said traction projections and having blades acting exteriorly and interiorly upon the rim.

3. The combination with a vehicle wheel rim having a series of spaced traction projections secured to said rim at corresponding extremities and having end portions outwardly spaced from the rim, of a scraper member having a blade exteriorly engaging the rim and adapted to pass between the rim and said projections.

4. The combination with a vehicle wheel, of a scraper member carried by said vehicle and engaging the rim of said wheel, said member being removable from said vehicle under a predetermined rotative stress exerted by the wheel.

5. The combination with a vehicle wheel, of a scraper engaging the rim thereof, a bracket supporting said scraper and means securing said scraper to said bracket, removable from said bracket under a predetermined excessive stress exerted by the wheel.

6. The combination with a vehicle wheel and vehicle frame, of a scraper engaging the rim of said wheel, an arm carried by said scraper, a socket member engaging said arm and means retaining said arm in said socket yieldable under a predetermined excessive stress exerted by the wheel upon said scraper.

7. In a vehicle wheel, the combination with the rim thereof, of a circumferentially spaced series of traction projections carried by said rim secured to the rim at corresponding ends and having their other end portions outwardly spaced relative to said rim.

8. In a vehicle wheel, the combination with the rim thereof, of a circumferential rib and a spaced series of transverse cleats carried by the circumferential rib and outwardly spaced from the rim.

9. In a vehicle wheel, the combination with the rim thereof, of a circumferential rib extending substantially centrally of the rim, and a plurality of transverse cleats carried by said rib in opposed relation and outwardly spaced from the rim.

10. In a vehicle wheel, the combination with the rim thereof, of a detachable sectional traction member, each section comprising a circumferential rib and a plurality of transverse cleats extending laterally therefrom and spaced from said rim.

11. In a vehicle wheel, the combination with the rim thereof, of a detachable sectional traction member carried by said rim, each section comprising a circumferential rib and a plurality of transverse cleats carried by the circumferential rib and outwardly spaced from the rim, a pin and socket connection between each section and the rim, and means detachably connecting the ends of the series of sections.

12. In a vehicle wheel, the combination with the rim thereof, of a circumferential rib carried by the rim, and a plurality of circumferentially spaced cleats extending from said rib and outwardly spaced from said rim.

In testimony whereof I affix my signature.

HENRY M. FERRY.